Figure 1:
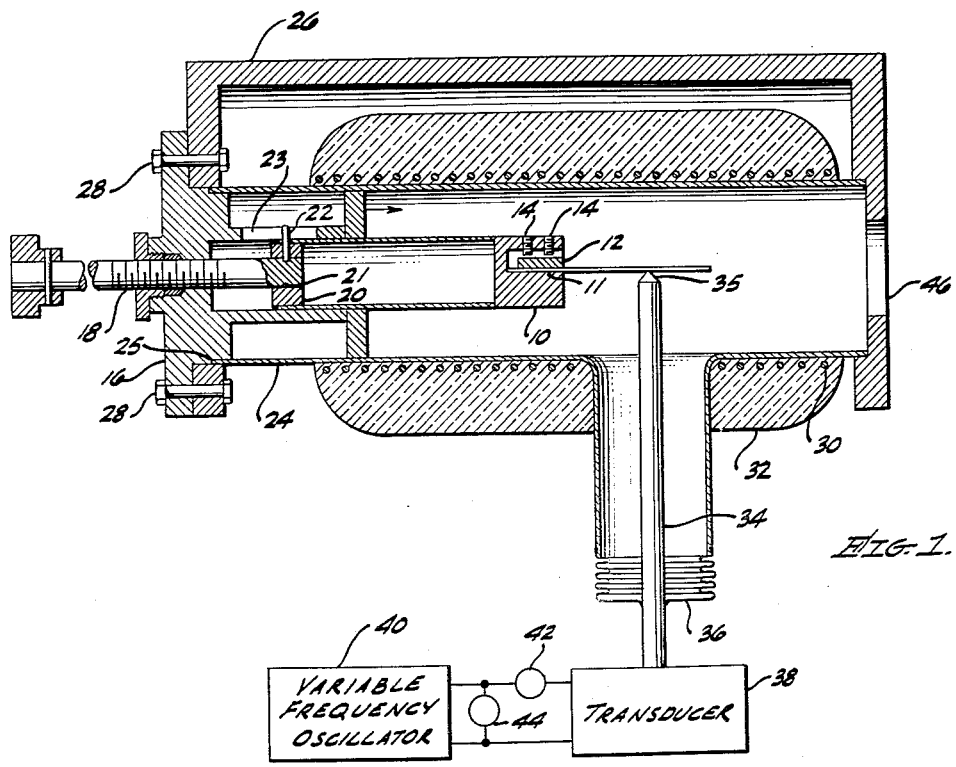

Nov. 22, 1960    R. A. SPURR ET AL    2,960,862
ELASTOMETER
Filed May 25, 1956

INVENTORS
ROBERT A. SPURR,
HOWARD MYERS,
BY
ATTORNEY.

United States Patent Office 2,960,862
Patented Nov. 22, 1960

2,960,862

ELASTOMETER

Robert A. Spurr, Palos Verdes Estates, and Howard Myers, Los Angeles, Calif., assignors to Hughes Aircraft Company, Culver City, Calif., a corporation of Delaware Filed May 25, 1956, Ser. No. 587,307

7 Claims. (Cl. 73—67.2)

This invention relates generally to elastometers and particularly to the type of elastometers which are used for determining the elastic modulus in flexure of a plastic material by measuring the natural frequency of a vibrating bar or strip that is clamped in a cantilever manner.

To predict the physical behavior of most plastic materials it is necessary to obtain measurements at various temperatures because of the appreciable variation of the characteristics of the material with varying temperature. In obtaining measurements at the desired temperatures, a testing device must be used which will apply high rates of stress to the plastic material. The application of low rates of stress to plastic materials will not yield accurate measurements because of the existence of creep. One method of applying high rates of stress to a rigid material is by causing a bar of the material that is supported at one or both ends to vibrate at its resonant or natural frequency. Moreover, the natural frequency of vibration of a particular specimen can be used to calculate the elastic modulus in flexure or Young's modulus of elasticity.

Instruments have been constructed to measure this natural frequency by exciting vibrations in a cantilever bar by means of a variable frequency vibration generator and measuring the frequency at which the amplitude of vibration is a maximum. The coupling or interaction of forces between the vibration generator and the test specimen results in an inaccurate measurement of the natural frequency because of the influence of the coupling forces between the vibration generator and the test specimen. The known instruments do not provide a variable coupling between the vibrating apparatus and the test specimen for deriving information that can be used to determine and minimize the errors present in the measured frequency that are introduced by the vibrating apparatus. Where the resonant frequency of the vibration generator is close to the natural frequency of the test specimen, the error introduced by the coupling forces between the vibrating apparatus and the test specimen is large. To minimize this error the dimensions of the test specimen can be chosen so that it will resonate at an appreciably different frequency from the resonant frequency of the vibrating apparatus. However, when the strength and natural frequency of a test specimen vary appreciably under test conditions such as temperature, the coupling error may be very large at some of the frequencies measured. In studying the effects of temperature on the strength of test specimens the instruments of known construction have the further disadvantage of requiring that the entire instrument be placed in a furnace or the like. This subjects the vibration generator to elevated temperatures and may result in damaging the generator.

It is an object of this invention to provide an improved instrument for determining the true natural frequency of an elongated specimen which minimizes the errors introduced by the influence of the vibration generator on the motion of the vibrating test specimen.

It is another object of this invention to provide an improved instrument for deriving information for determining the elastic modulus in flexure of a supported bar by vibrating the bar at its apparent natural frequency with a vibration generator in which the coupling between the vibration generator and the vibrating bar can be changed to minimize the errors in the measured frequency resulting from coupling with the motion of the vibration generator.

It is a further object of this invention to provide an improved instrument for deriving information for determining the elastic modulus in flexure by vibrating a supported bar at its apparent natural frequency under controlled temperatures in which the vibration generator is not subjected to high temperatures.

In accordance with the invention, an instrument is provided for measuring the apparent natural frequency of an elongated bar test specimen which supports the test specimen, at one or more points, vibrates the test specimen at various frequencies by imparting an oscillating motion from a vibration generator at a predetermined distance from a vibrational node, and changes this distance to effect a change of coupling between the vibration generator and the vibrating test specimen.

The novel features which are believed to be characteristic of the invention both as to its organization and method of operation together with further objects and advantages thereof will be better understood from the following description considered in connection with the accompanying drawing in which a preferred embodiment of the invention is illustrated. This drawing is for the purpose of illustration and description only and is not intended as a definition of the limits of the invention.

Figure 2:
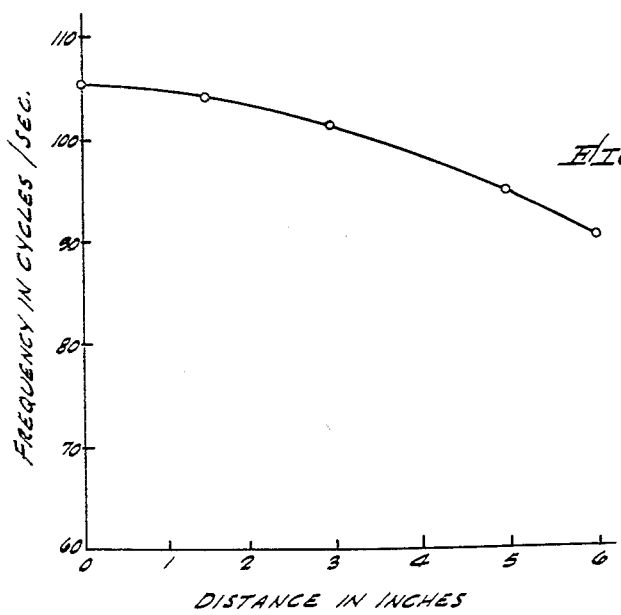

Fig. 1 illustrates a preferred embodiment of the apparatus and Fig. 2 is a graph showing a curve which represents a typical plot of apparent frequencies of maximum amplitude of a plastic material plotted against the distance between the fixed end of a clamped test specimen and the point of transmission of the driving forces as measured by the instrument of this invention.

Referring to Fig. 1, a cylindrical clamping member 10 having a flat surface 11, cooperating plate 12 and set screws 14 on one end thereof is provided for supporting one end of a test specimen in a cantilever manner to provide a vibrational node at the fixed end. A supporting housing 16 may be provided to support the other end of the clamping member 10 and permit axial movement therewith. An actuating screw 18 may be threaded to engage a threaded portion of the supporting housing 16 and connected to the clamping member 10 by means of a bearing 20, groove 21 and guide pin 22 to cause the clamping member to move in the axial direction as the actuating screw is turned. Guide pin 22 cooperates with the bearing 20, groove 21 and a longitudinal slot 23 to keep the clamping member from rotating as it is moved axially with respect to the supporting housing.

To permit the atmosphere surrounding the test specimen to be controlled there is provided an enclosing envelope 24 which surrounds the clamping member and abuts the supporting housing at annular surface 25 to form an airtight seal. To secure the enclosing envelope in place and form an airtight enclosure, a U-shaped clamp 26 may be provided and bolted to the supporting housing by means of bolts 28. The instrument may be equipped with a heating coil 30 that surrounds the envelope 24. Suitable temperature controlling devices which are well known in the art can be used in conjunction with the heating coil 30 to accurately control the temperature within the enclosing envelope. To provide a more efficient heating system, an insulating layer 32 of suitable material may be wrapped around the heating coils and enclosing envelope. A driving shaft 34 is positioned for extension into the housing and enclosing envelope for engaging the clamped test specimen with a forcing end 35. To permit movement of the shaft 34 and maintain an airtight relationship within the envelope 24, a bellows 36 is furnished. The other end of the driving shaft 34 is connected to a suitable vibration generator which may be in the form of a transducer 38 and variable frequency oscillator 40. The transducer 38 may be an electromechanical device such as a solenoid, piezo-electric crystal or magnetostrictive device and the oscillator 40 may be an audio oscillator that has a sinusoidal output. An ammeter 42 and voltmeter 44 may be suitably connected across the output of the variable frequency oscillator 40 to measure the power that is transmitted to the transducer. To permit visual observation of the vibrating end of the test specimen, a transparent viewing port 46 may be provided in the end of the U-shaped clamp that is oppositely situated with respect to supporting housing 16.

In operation, a test specimen of suitable dimensions such that it will have a natural frequency of vibration within the range of the variable frequency oscillator at the desired temperatures is placed within the cylindrical clamp 10 and secured by means of the set screws 14. The supporting housing 16 is then inserted into the enclosing envelope 24 and secured thereto by means of the bolts 28. The actuating screw 18 is turned to position the test specimen such that the forcing end of the driving shaft engages the test specimen a known distance from its fixed end. The frequency of the variable frequency oscillator is adjusted to yield the greatest vibrational amplitude of the test specimen and this frequency is recorded. The frequency providing the greatest vibrational amplitude can be observed visually by viewing the oscillating end of the test specimen with a telescope which is positioned adjacent the viewing port 46 or can be determined by measuring the power output of the oscillator. A minimum of power is transmitted to the test specimen when it is vibrating at resonance.

The actuating screw 18 is now turned to position the fixed end of the test specimen another known distance from the forcing end of the driving shaft and the procedure repeated to find the resonant frequency of the test specimen for this position of the driving shaft. This procedure may be repeated as many times as is desired obtaining an apparent frequency of maximum amplitude of the test specimen for each position of the forcing end of the driving shaft with respect to the fixed end of the test specimen.

Referring to Fig. 2, the values of the apparent frequency of maximum amplitude of the vibrating test specimen may be plotted against the known distance of the forcing end of the driving shaft from the fixed end of the sample or from a vibrational node. A curve may be drawn through these points and extrapolated to cross the ordinate. The frequency at which this curve intersects the ordinate is a measure of the true natural frequency of the test specimen alone. By extrapolating this curve to the ordinate, the effects of the driving forces of the driving shaft on the motion of the free end of the test specimen are eliminated. Using this frequency, the elastic modulus in flexure or Young's modulus is given by $$E = 38.24 \rho \frac{L^4}{D^2} f^2$$

where E is the modulus in dynes per square centimeter, $\rho$ is the density of the material, L and D respectively are the free length and the thickness of the test specimen in centimeters, and $f$ is the true natural frequency in cycles per second.

A measure of the internal friction of the test material can be obtained by determining the apparent frequencies just above and below the apparent resonant frequency of the test specimen where the amplitude of vibration is one half the amplitude at resonance. These frequencies can also be plotted on a curve and extrapolated, as in the case of determining the true natural frequency, for eliminating the effects of the vibrating apparatus. This measure of internal friction is given by the equation $$\sigma = \frac{\pi}{\sqrt{3}} \frac{f_2 - f_1}{f}$$

where $f_2$ and $f_1$ are those frequencies just above and below, respectively, the true natural frequency $f$ where the amplitude has one-half its maximum value.

As will be obvious to those skilled in the art, many possible devices could be designed for transmitting the oscillating motion of a transducer at various points along the longitudinal axis of a supported specimen. A preferred embodiment of clamping a test specimen in a cantilever manner and moving the clamp and test specimen with respect to the transducer and its associated driving shaft is by way of example only and is not intended to limit the scope of the invention. Since a bar has one true natural frequency when it is supported in a cantilever manner and another true natural frequency when it is supported at both ends, the test specimen may be supported at either or both ends and may be held in a vertical or horizontal position. Other obvious variations and changes could be made in the apparatus shown without departing from the scope of the invention.

In accordance with the present invention, there is provided an instrument for determining the elastic modulus in flexure of a rigid material by vibrating a supported bar of the material at its apparent natural frequency under controlled conditions such as temperature and atmosphere, in which the mechanism causing the test specimen to vibrate can transmit these forcing vibrations at various points along the longitudinal axis of the test specimen and thereby permit an accurate determination of the true natural frequency while eliminating the influence of the coupling forces between the vibrating apparatus and the test specimen.

What is claimed is:

1. An instrument for determining the true natural frequency of an elongated test specimen comprising, in combination: a clamping member for supporting said test specimen to provide at least one vibrational node; vibrating means mechanically coupled to said test specimen for applying an intermittent force to said specimen at a predetermined distance from said vibrational node to cause said specimen to vibrate at an apparent natural frequency; and means for moving said specimen relative to said vibrating means to change said predetermined distance thus to obtain other apparent natural frequencies, whereby the true natural frequency of said specimen without the influence of said vibrating means may be determined by extrapolation.

2. An instrument for determining the true natural frequency of an elongated test specimen comprising, in combination: a clamping member for supporting said test specimen in a cantilever manner; a driving shaft having a forcing end positioned for engagement with a lateral surface of a free end of said test specimen; a transducer operatively coupled with said driving shaft; means including said transducer for imparting a variable frequency oscillating motion to said driving shaft; and means for adjustably longitudinally moving said specimen relative to said forcing end while maintaining said forcing end in engagement with said lateral surface to position said forcing end at various predetermined distances from a fixed end of said specimen thus to permit measurement of various apparent natural frequencies, whereby the true natural frequency of said specimen without the influence of said driving shaft and said transducer may be determined by extrapolation.

3. An instrument for determining the true natural frequency of an elongated test specimen comprising, in combination: a housing having a clamp member secured thereto; a clamping member mounted for movement within said housing and adapted to support said test specimen in a cantilever manner; a driving shaft extending into said housing and having a forcing end positioned for engagement with a lateral surface of a free end of said test specimen; a transducer operatively connected to the other end of said driving shaft; a variable frequency oscillator connected to said transducer for causing said transducer to impart an oscillating motion to said driving shaft; and means for moving said clamping member towards or away from said forcing end of said driving shaft while maintaining said lateral surface in engagement with said forcing end, said clamp member including a light transmitting aperture therein for permitting visual observation of said test specimen thus to permit measurement of various apparent natural frequencies of said test specimen, whereby the frequency at which the greatest vibrational amplitude occurs for any given position of said clamping member with respect to said forcing end of said driving shaft may be determined.

4. In an instrument for determining a true natural frequency of an elongated test specimen comprising, in combination: a housing; an elongated envelope secured to said housing; a test specimen support positioned within said envelope and adapted to support said test specimen in a cantilever manner; means carried by said housing and connected to said support for longitudinally adjustably positioning said test specimen in said envelope; heating means disposed about said envelope for subjecting said test specimen to predetermined temperatures; a driving shaft movably carried by said envelope and having a free end positioned for engagement with a lateral surface of said specimen; a transducer operatively connected to said driving shaft and positioned externally of said heating means to insulate said transducer from effects of said heating means; and means including said transducer for imparting a variable frequency oscillating motion to said driving shaft and said test specimen, said motion imparting means being adapted for adjustment to a frequency of vibration equal to an apparent natural frequency of said specimen at various distances along said specimen and from said support, a true natural frequency of said specimen being thereafter determined by extrapolation.

5. A true natural frequency determining instrument according to claim 4 wherein the interconnection between said driving shaft and said envelope comprises a bellows carried by said envelope.

6. A true natural frequency determining instrument according to claim 4 wherein said heating means comprises an electric coil wound about said envelope, there being an insulating coating about said coil.

7. A true natural frequency determining instrument according to claim 4 wherein means are provided adjacent one end of said envelope remote from said housing for permitting visual inspection of said test specimen.

References Cited in the file of this patent

UNITED STATES PATENTS

| | | |
|---|---|---|
| 1,163,830 | Kommers | Dec. 14, 1915 |
| 2,156,592 | Knox | May 2, 1939 |
| 2,554,212 | Quinlan | May 22, 1951 |